(12) United States Patent
LeJeune (10) Patent No.: US 8,757,268 B2
(45) Date of Patent: Jun. 24, 2014

(54) SELF CENTERING DOWNHOLE FLOAT VALVE FOR VERTICAL AND LATERAL WELLS

(75) Inventor: Robert J. LeJeune, Lafayette, LA (US)

(73) Assignee: BL Sales & Management, Inc., Lafayette, LA (US)

( * ) Notice: Subject to any disclaimer, the term of this patent is extended or adjusted under 35 U.S.C. 154(b) by 458 days.

(21) Appl. No.: 13/066,321

(22) Filed: Apr. 12, 2011

(65) Prior Publication Data

US 2011/0192608 A1 Aug. 11, 2011

Related U.S. Application Data

(63) Continuation-in-part of application No. 12/454,819, filed on May 22, 2009, now abandoned.

(51) Int. Cl.
*E21B 34/06* (2006.01)

(52) U.S. Cl.
USPC ........................................ 166/325; 137/515.5

(58) Field of Classification Search
USPC .......................... 166/320, 321, 322, 325, 327; 137/515–515.7
See application file for complete search history.

(56) References Cited

U.S. PATENT DOCUMENTS

| | | | |
|---|---|---|---|
| 87,775 | A | 3/1869 | Himes |
| 1,135,809 | A | 4/1915 | Jones |
| 1,524,471 | A | 1/1925 | Benckenstein |
| 2,155,744 | A | 4/1939 | Westrum |
| 2,858,838 | A * | 11/1958 | Scaramucci ............... 137/454.2 |
| 2,870,784 | A * | 1/1959 | Walls ............................ 137/543 |
| 3,302,722 | A | 2/1967 | Madeley, Sr. |
| 3,419,040 | A * | 12/1968 | Thibodeaux ............... 137/515.7 |
| 3,450,207 | A | 6/1969 | Hirsh |
| 3,794,077 | A | 2/1974 | Fanshier |
| 3,845,784 | A * | 11/1974 | Sullivan ........................ 137/515 |
| 4,624,316 | A | 11/1986 | Baldridge et al. |
| 5,117,861 | A | 6/1992 | McConnell et al. |
| 5,139,085 | A | 8/1992 | Duvallet |
| 5,379,835 | A | 1/1995 | Streich |
| 5,450,903 | A | 9/1995 | Budde |
| 5,472,053 | A | 12/1995 | Sullaway et al. |
| 5,680,902 | A | 10/1997 | Giroux et al. |
| 5,687,792 | A | 11/1997 | Rodger et al. |
| 5,690,177 | A | 11/1997 | Budde |
| 5,850,881 | A | 12/1998 | Rodger et al. |
| 6,044,545 | A | 4/2000 | Ohshita |
| 6,349,771 | B1 | 2/2002 | Luke |
| 6,598,685 | B1 | 7/2003 | Mashburn |
| 6,666,273 | B2 | 12/2003 | Laurel |

(Continued)

*Primary Examiner* — Shane Bomar
*Assistant Examiner* — Kipp Wallace
(74) *Attorney, Agent, or Firm* — Michael L. Parks (57) ABSTRACT

A float valve with upper and lower valve bodies having axial flow there through and valve member having angular trailing edges at a swept back angle for providing a seating surface and a stem axially extending from the valve member. The stem having multiple supporting surfaces arranged cylindrically and having a biasing member fitted there about. The upper valve body having an internal annular seat for seating with the valve member seating surface and external seals for engaging oilfield tubulars and threaded on one end. The lower valve body having a central internal support member for support of the valve member stem for axial movement and threaded on one end for joining the upper valve body and compressing the biasing member to engage the seating surfaces of the valve member and internal annular seat of the upper valve body for engagement and disengagement in response to fluid flow pressure.

12 Claims, 7 Drawing Sheets

(56) References Cited

U.S. PATENT DOCUMENTS

| | | |
|---|---|---|
| 6,871,410 B1 | 3/2005 | LeJeune |
| 6,944,545 B2 | 9/2005 | Close et al. |
| 6,971,406 B2 | 12/2005 | Takahashi |
| 7,165,633 B2 | 1/2007 | Hall et al. |
| 7,188,688 B1 * | 3/2007 | LeJeune ........................ 175/312 |
| 7,243,742 B2 | 7/2007 | Kutryk |
| D580,009 S | 11/2008 | LeJeune |
| 2005/0109503 A1 | 5/2005 | Kutryk |
| 2006/0065444 A1 | 3/2006 | Hall et al. |
| 2008/0264628 A1 | 10/2008 | Coronado et al. |
| 2009/0008988 A1 * | 1/2009 | Daigre ............................. 303/2 |
| 2009/0160246 A1 | 6/2009 | Daigre |
| 2011/0079142 A1 * | 4/2011 | Albrecht et al. ............ 92/181 R |

* cited by examiner

SELF CENTERING DOWNHOLE FLOAT VALVE FOR VERTICAL AND LATERAL WELLS

RELATED APPLICATION

This application is a continuation-in-part of application Ser. No. 12/454,819 filed on May 29, 2009, titled "DownHole Float Valve and Joint Strainer Assembly".

BACKGROUND OF THE INVENTION

1. Field of the Invention

The present invention relates to an improved float valve of the type used in hydrocarbon recovery operations with oilfield tubular materials in downhole operations. More particularly this invention relates to a float valve which can be used in either vertical or horizontal well bores and provides smooth functionality in the transition between vertical or horizontal well bores and improved life of the float valve. The invention further relates to the ease of the float valve assembly for all its parts and for precise and exact tolerance relationships for all its parts when assembled. The invention provides improved fluid flow through the float valve and sealing relationship by providing functionally improved angles between its seating surfaces. Also this invention provides improved fluid flow through the float valve by improved configurations of the axial stem of the valve member movably mounted in the float valve. This invention also provides surfaces and landing sites on the float valve for technology associated with sub joint strainers, spiders or X-collar filters to be used in cooperation with the float valve for improved performance.

2. Background of the Invention

Float valves have long been used in oilfield drilling operations with drilling fluids for drilling oil and gas wells. However over time, improvements have been made to drilling operations which include lateral wells, as well as vertical wells, and ever more exotic drilling fluids, gels and even high pressure air had been put into use. The new drilling fluids pass through the drill string like the older drilling fluids, and through the float valve but create new and enhanced stress and wear on the float valves, especially in lateral wells. In the case of high pressure air drilling operations for example, a float valve may open and close in excess of a hundred times per minute thereby exerting excessive forces on the moving valve member parts. Also new components have been developed for drilling fluid such as glass or other kinds of beads which are very fine, but abrasive, and can stick between moving parts of a float valve. Further lateral wells put the float valve and drilling head into a different gravitational alignment than vertical drilling which can cause wear and alignment problems with moving parts of a float valve.

The float valve is generally installed in a tubular string for running in a well bore by installing the float valve in a float body or bored-out drill collar of a tubular string. The float body may be positioned between two joints in a tubular string and is conventionally connected to the tubular string with conventional oilfield tubular threads such as a threaded box and pin connections for sealing engagement with conventional oil field tubular threads. When the float valve is positioned within the float body, seals provided on the exterior of the float valve body engage against the interior surfaces of the float body and provide a seal against high and low pressure fluids passing between the float body and the exterior of the float valve. Once the seal between float body and the exterior of the float valve is sealed all fluids are then flowed through the float valve and controlled by the float valve.

Fluid flow through a float valve body is controlled by the pressure of the fluid being flowed against a valve member positioned within the float valve body which overcomes the valve member's sealed and seated relationship against the seat on the interior surface of the float valve body which is created by the biased engagement of a spring against the valve member. While a float valve is necessary to control backflow from within the well and allow down flow of fluids being flowed from above, a float valve also is a restriction to flow in the profile between the valve member seat and the angular seat in the interior of the float valve body even when the float valve is fully open. This restrictive flow profile can have an affect on the functionality of the drilling operation and can create wear on those parts exposed to flow. Also the flow profile opening, between the valve member seat and the angular seat of the float body, can create turbulence in the fluid passing through which can cause vibration in the moving parts of the float valve. Further vibration and turbulence in the presence of drilling fluids, which contain drilling muds, chemicals, drill cuttings, glass or other kinds of beads, etc. can have abrasive affects on the valve member at the edges of its seating surfaces and on the stem of the valve member and on the spring for creating excessive wear which leads to a short life and ultimate failure of the float valve. Also the drilling fluids can, because of their small particle size, become jammed between the moving surfaces of the valve member stem and its supporting structure within the float valve body to create problems. Also this turbulence interferes with the smooth fluid flow of the drilling fluid to the drill bit or other piece of equipment in the drill string and therefore it is desirable to have a smooth flow and as large a volume of flow as possible through a float valve.

The prior art float valves have included a unitary valve member which was cast in one piece and included both the stem and valve member head, which engaged the valve seat located in the interior of the float valve body. Due to the exotic surfaces necessary to form a seal and the high cost of manufacturing this unitary valve element, two-piece valve elements are more commonly used in float valves and joined together at their stem and valve member head by conventional means. Various means of joining the two-piece, stem and valve member head, have been used including inertia welding and other mechanical interconnectors. Even exotic special means of connection were used such as using a shrink fit operation where the valve member head/cone includes a cylindrical shaped recess for receiving a front end of the stem during the shrink fit operation, wherein the valve member head/cone is heated relative to the stem, and the stem is impressed into the cylindrical recess for union and then both are air cooled for connection. This fitting or union is subject to being damaged in drilling operations because of the elevated downhole temperatures and due to vibrations to which the valve stem and valve member head/cone are subjected, specially in lateral well forces.

The float valve bodies, into which the valve members are inserted, are today cast as a single piece unit which creates problems with assembly. Assembling such cast valves bodies requires a window in the casting to allow for the insertion and manipulation of the valve member head with its valve stem and spring into the float valve body through the window. To achieve this large clearances must be allowed for such awkward installation which often results in wobble or deviation of the valve member head and its stem within the float valve body, thereby resulting in excessive wear on the valve member head and its stem and the valve stem bearing/bushing which shorten the life of the float valve. The wobbles and deviations of the valve member head and it's stem within a float valve bodies cast as a single piece are even greater and more likely to cause failure in an horizontal wells because of gravitational forces being perpendicular to the stem and valve member head.

The prior art float valves have also tended to use elastomeric seals and valve bushings with valve member heads to affect sealing engagement and allow smooth movement of the stem within the float valve between its open and closed positions. The prior art float valves using elastomeric seals tended to use large angles for the valve member head seats which were 45° to 90° and greater, because the valve head seats were not the primary source of sealing engagement but were used in conjunction with the elastomeric seal to form the seal between valve member head and the seat of the float valve body. This arrangement formed a good seal, but as the elastomeric seals wore down from operation in the abrasive environment of drilling fluids, these prior art float valves had a shorter life and were subject to catastrophic failure. The other soft spot for failure in the prior art float valves was at the valve bushing into which the stem of the valve member head was mounted to provide a smooth surface on which to slide back and forth in the operation of opening and closing the float valve. In the current drilling fluid environment these valve bushings/bearing were rapidly destroyed by the drilling fluids and thus left the stem of the valve member head loose in its mounting which allowed wobble in the valve member head and caused early failure of the float valve. This problem is especially acute in lateral wells because of the gravitational force being perpendicular to the stem of the valve head member versus being in alignment with the gravitational forces in vertical wells.

The prior art tended to focus on creating a reliable float valve, but did not focus as much on the flow profile of the opening between the valve head member and its seat on the inside of the float valve body and the flow passage through the rest of the float valve body where the stem of the valve head member and supporting structure were located to create smooth non-turbulent flow through the float valve. Thus the prior art provided seating surfaces on the valve head member which were 45° to 90° or greater angles through the line of the flow and thus seating surface on the interior of the valve body tended to be a problem. These angles for the seating surfaces tended to push the drilling fluid out of its normal path of flow and create excess turbulence at that point of flow in the valve body. In addition, the prior art did not provide for any cover or protection of the spring member and stem to the corrosive and abrasive fluid turbulence created by the seating surfaces on the valve head member just behind the valve member head where the spring and stem were located thereby exposing them to excessive wear which caused early failure in float valves. Also the prior art stems were generally cylindrical rods mounted in a sleeve bearing/bushing which was mounted in a supporting structure within the flow way of the lower half of the valve body to support the stem for smooth and even movement in and out as the float valve was operated. The cylindrical rods and support structure for them with sleeve bearings/bushing took up a great deal of cross-sectional area in the float valve body and restricted flow and positioned the sleeve bearing/bushing directly in line with corrosive and abrasive turbulent flow of the drilling fluid causing early failure in the float valve. These failures occurred in many ways, but in at least one way, as the drilling fluids destroyed the sleeve bearing/bushing it began to open up crevices which allowed the drilling fluids and their small particles to be jammed in between the stem and sleeve bearing/bushing not only causing additional wear but in some instances prevented the stem from sliding in and out in the sleeve bearing/bushing causing failure of the float valve.

Those skilled in the art would recognize that failure of a float valve can have significant adverse consequences, because any failed piece of equipment in a drill string requires a trip out and back in to the well which interferes with drilling operations. The prior art float valves were treated as separate units apart from sub joint strainers or X-collar filters which were used apart from the float valves to stop foreign particles in the drilling fluid from being jammed into the float valves or other operational equipment below and could not and did not function in direct relationship with a float valve or could be landed and be seated on a float valve because the float valve were not built to receive such filters and strainers.

OBJECTS OF THE INVENTION

It is the object of this invention to provide an improved float valve for use in drilling operations which can be used in vertical or horizontal well bores and function smoothly in the transition from vertical or horizontal in the well bore as the gravitational forces shift from alignment with the float valve to being perpendicular to the float valve while being joined to the drill string in a conventional way. Also it is an object of this invention to provide a float valve which can work with and endure exotic drilling fluids gels and high pressure air and additive such as glass or other kinds of beads and still have an improved life for the float valve, while providing improved fluid follow and reduced turbulence in the flow through the float valve.

It is an object of this invention to utilize typical float valve elements such as a valve body, valve member which has a the valve member head and a stem which extends axially from the valve member head, a biasing member positioned about the stem and support structures for the stem for allowing the valve member head to move back and forth to form alternatively sealing and opening in response to fluid flow, but to use novel parts and configurations to achieve a novel result and an improved float valve while eliminating the soft parts such as elastomeric seals and sleeve bearings/bushings, which are prone to wear rapidly in the drilling fluid environment.

The valve body of the float valve of this invention is comprised of an upper tubular valve body member and a lower tubular valve body member, rather than a single cast valve body with a window in the valve body for insertion of the valve member and includes a valve member head with an axial stem, and a resilient/spring member. This upper and lower tubular valve body member of this invention are joined together by threads to create a unitized valve body with very tight tolerances. The upper valve body member has axial flow there through and has an internal angular seat for seating with the seating surface of the valve member and an external seal for sealing engagement with oilfield tubulars and threads on the lower part of the upper tubular valve body member. The lower tubular valve body member has axial flow there through and has an internal web portion with a central longitudinal support member which has an axial aperture therein for providing surfaces for support and for allowing axial movement of the stem of the valve member and the valve member when the stem is inserted in the axial aperture. Once the stem is inserted in the axial aperture of the lower tubular valve body member the upper tubular valve body member may be joined by threading the upper and lower tubular valve body members together. In the process of joining the upper and lower tubular valve body members they compress the spring biasing member positioned about the stem to engage the seating surfaces of the beveled trailing edge of the head portion of the valve member with an internal annular beveled seat of the upper tubular body member to make the float valve operational. Thus it can be seen that this invention allows for easy installation of the valve member in the valve body and creates a float valve with exacting tolerances between its parts to prevent misalignment and vibration of the moving parts.

Also an object of this invention is to provide a float valve which is easy to assemble and which does not require a window in the body of the float valve for insertion or manipulation of the valve member head, stem, and spring biasing member through the window into the float valve body. It is the object of this invention that as all float valve parts are assembled they have precise and exact tolerances in relationships with each other to work together smoothly for enhanced float valve life. This is achieved in this invention by using a valve body member which is composed of an upper and lower tubular valve body members which are joined by threads to form the float valve body and a valve member having an axial stem and a spring located about the stem for biasing the valve member into engagement within the valve body of the float valve. The upper tubular valve body member has an upper and lower part which allows axial flow there through and has an internal angular beveled seat for seating with the valve member seat and external seals for sealing engagement with the oilfield tubular or valve body which is joined to the tubular string of a well. The upper tubular valve body member has threads for being joined to the lower tubular valve body member. The lower tubular valve body member also has upper and lower parts for axial flow there through but lower tubular valve body member has an internal web portion which has a central longitudinal support member provided with an axial aperture therein for providing surfaces for support and allowing axial movement of the valve member with the axial stem in the valve body member. The precision and simplicity of assembly can be understood by the fact that stem of the valve member is inserted into the axial aperture of the internal web portion in the lower tubular valve body member with the spring about the stem and then the upper tubular valve body member is threadly connected to the lower valve body member. As this connection progresses to completion the valve member and spring are compressed to engage the valve member into engagement with the internal annular beveled seating surface of the upper tubular valve body member for creating an operational float valve with precise tolerances and relationships. The tolerances and structural relationships are such that there is no need for elastomeric seals or valve bearings/bushings as will become evident from further objects and descriptions to follow.

As a part of this invention, it is an object to provide enhanced fluid flow and long-lasting seal relationship of the valve surfaces by providing functionally improved angles between the seating surfaces which provide for smooth fluid flow through the float valve and over its valve seating surfaces. Also as part of this improved fluid flow is an improved configuration of the axial stem of the valve member in the float valve which is movably mounted in the float valve. The improved fluid flow and long-lasting sealing relationship of the valve seating surfaces are provided by the head member of the valve member seating surfaces having an angular trailing edge portion at a swept back angle of 45° or less than 45° from the axial alignment with the stem of the valve member. The internal and angular beveled seat of the upper tubular valve body member is formed at a complementary angle to the valve member seating surface to form substantially matching seating surfaces with the valve member seating surfaces when the two are engaged. The swept back angles of 45° or less than 45° provide less obstruction to the fluid flow and also provides a self centering valve seat for the valve member. One of the enhanced benefits of having swept back angles of 45° or less than 45° from the axial alignment with the stem of the valve member is the forming of a relatively large surface area for the seat of the float valve of this invention which is less subject to wear and can thus be used with the improved drilling techniques and fluids and also used in lateral wells as well as vertical wells. Thus the float valve of this invention can be used with high pressure air drilling operations or with the new gels and muds containing glass or other kinds of beads without any effect on its moving parts or from abrasion from the muds in both lateral and vertical wells.

The float valve of this invention uses a unitary valve member, which includes both a stem and a valve member head, which some cases is a conical head, having angular trailing edge portions beveled off at the trailing edge portion of the valve member head which creates a swept back angle from the head portion for providing a seating surface. By using a unitized valve member, the float valve of this invention eliminates the failure between the valve member head and stem which commonly occurs in two-piece valve elements which are commonly used. Also the use of the unitary valve member having angular trailing edge portions beveled off at the trailing edge portion to create a swept back angle for providing a seating surface provides a self centering seating surface of the valve member for complete alignment of the valve member in the float valve and transmits the forces smoothly throughout the valve member body eliminating vibration. Because the valve member is a unitary piece there are no joints between the valve member head and the stem to be broken apart during the transmission of forces through the valve member.

As part of the improved fluid flow through the float valve is an enhanced configuration of the axial stem of the valve member in the float valve which is movably mounted in the float valve. This enhancement provides a stem portion from the valve head member as a unitary piece having at least three contact surfaces for engagement with the surfaces forming the axial aperture of the central and longitudinal support member for allowing axial movement and for support of the stem portion of the valve member. The, at least three contact surfaces, triangular shape stem removes much cross-section area of the stem relative to the fluid flow and allows more fluid flow. It also eliminates the need for sleeve bearings and bushings to be used about the stem which also improves the fluid flow and extends the life of the float valve by eliminating these short lived parts.

Another object of this invention is to provide a protective cover on the valve member to cover the spring biasing member as the valve member is moved axially to a fully open position in the lower valve body member in response to fluid flow. This protects the spring biasing member from the drilling fluids which are circling and swirling about in the axial flow through the valve body member. Thus this protective cover on the valve member extends the life of the spring biasing member and therefore extends the life of the float valve.

While this float valve operates like other float valves to control backflow from within the well and allow down flow fluids to flow downward, the float valve of this invention is less disruptive of the flow in the profiles section between the valve member seat and the angular seat in the interior of the float valve body whether the float valve is partially opened or is fully open. This reduction of disruptive flow is because the seating surfaces of the valve member of this float valve are swept back at angles of 45° or less than 45° from the axial alignment with the stem of the valve member thus not protruding out into the fluid flow stream and allow the flow to stream by with little disruption. Also less turbulence is less restriction to fluid flow in passing the drilling fluid which produces less wear on the stem of the valve member and the spring which extends the life the float valve of this invention.

Yet another enhancement of this float valve is the elimination of elastomeric seals and valve bushings or bearings and yet it still provides sealing engagement and smooth movement of the stem within the float valve from its open and close positions.

The float valve of this invention may be installed in a conventional manner in a float body or bored out drill collar of a tubular string and is sealed against exterior fluid flow between the float valve body and the float body directing all fluids through the float valve. The float valve of this invention however has surfaces on the float valve body which are provided for receiving and positioning sub joint strainers or X-collar filters above the point of the drilling fluid entrance into the float valve, for filtering out debris before it passes into the float valve and further down the well bore to other operational drilling equipment which could be damaged if allowed to pass through. Thus sub joint strainers or X-collar filters may be landed on the float valve body and used in conjunction with the float valve for improved performance and contribute to smooth fluid flow into the float valve body and to prevent debris from passing into the float valve body causing it to fail.

These and further objects, features, advantages of the present invention will become apparent from the following detailed description, wherein reference is made to the figures in the coming drawings.

BRIEF DESCRIPTION OF THE DRAWINGS

Some of the objects and advantages of the present invention having been stated, others will become apparent as the description proceeds when taken in conjunction with the accompanying drawings, in which.

DETAILED DESCRIPTION OF PREFERRED EMBODIMENTS

Figure 1:
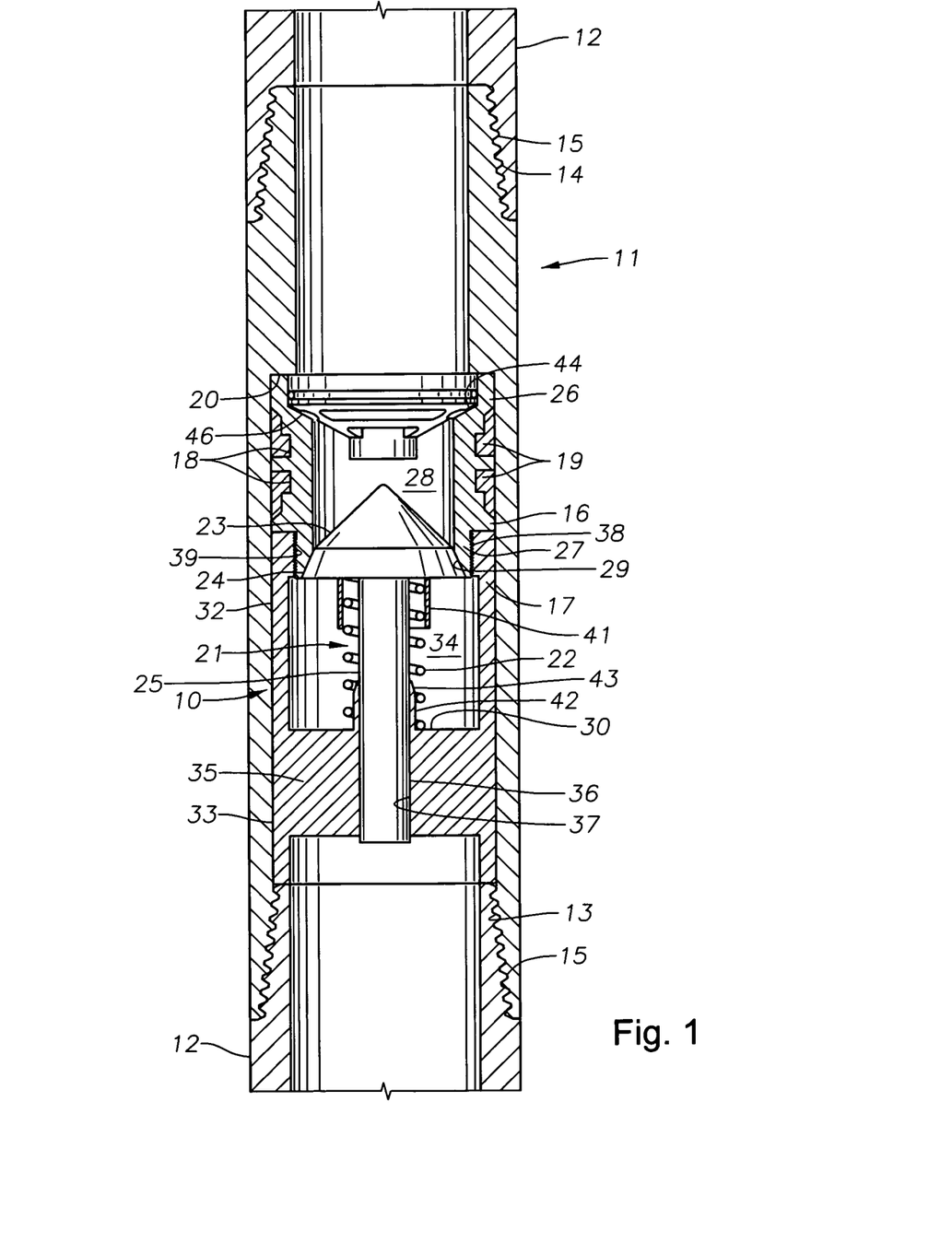
FIG. 1 is a side view, partially in cross-section, of one embodiment of the float valve of this invention in a closed position positioned in a float body in a drill string of a well and having an X-filter landed on its surfaces designed for receiving same.

Referring to FIG. 1 wherein at least one embodiment of the float valve of this invention is shown as it might be positioned in a drill string of an oil field tubular string positioned downhole in a well bore, it can be seen the float valve 10 is installed or inserted in a float body 11. The float body 11 is connected to the tubular string 12 between two joints in the tubular string 12 by conventional oilfield tubular threads such as threaded box 13 and pin connections 14 for sealing engagement with conventional oilfield tubular threads 15. The float valve 10 is composed of two parts an upper tubular valve body member 16 and a lower tubular valve body member 17 which are open to axial flow there through and when joined together form a generally cylindrical exterior surface for insertion in float body 11. The upper tubular valve body member 16 is provided with angular grooves 18 for receiving external seals 19 which when put in place form a seal between the float valve 10 and the float body 11 to prevent fluid flow between the float valve 10 and the float body 11, such that all flow will be directed axially through the float valve 10. Float body 11 maybe be provided as shown with a stopping surface 20 to finally position the float valve 10 within the float body 11. As those skilled in the art will recognize the above description for mounting the float valve 10 is a very general description and that there are many and various configurations which could be used to position the float valve 10 in the tubular string 12 without departing from the scope of this invention.

Figure 2:
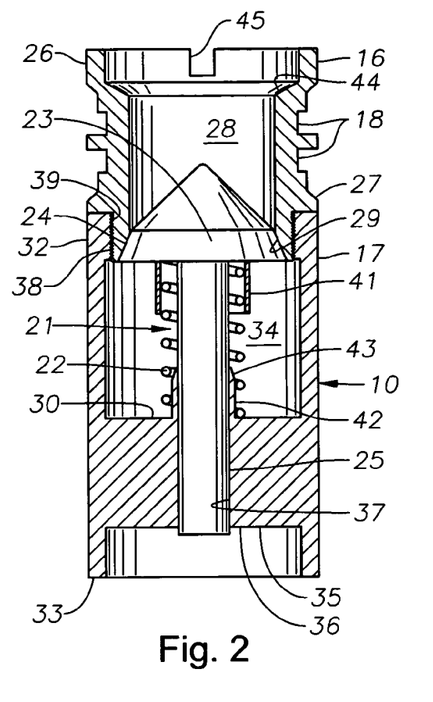
FIG. 2 is a side view, partially in cross-section, of one embodiment of the float valve of this invention in a closed position.
Figure 3:
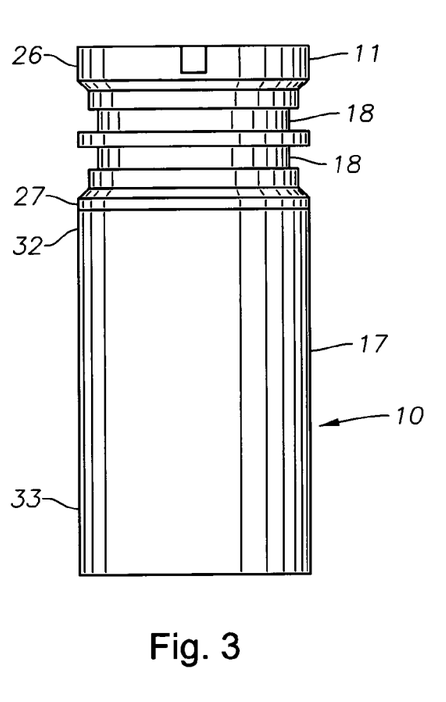
FIG. 3 is a side view of the float valve of this invention with the upper tubular valve body member and lower tubular valve body member joined together and showing grooved surfaces for seals and at least one notch receiving member formed in the upper part of the upper tubular valve body.

The float valve 10 in FIGS. 2 and 3 is generally composed of an upper tubular valve body member 16 and a lower tubular valve body member 17 which may be joined together to form the float valve 10 having a valve member 21 and biasing member 22 positioned within the upper tubular valve body member 16 and lower tubular valve body member 17. The biasing member 22 is positioned about the valve member 21 for biasing the valve member 21 into a closed position within the float valve 10 when upper tubular valve body member 16 and a lower tubular valve body member 17 are joined.

The valve member 21, in this embodiment, is composed of a conical head portion 23 and an angular trailing edge portion at a swept back angle from the conical head portion 23 for providing a seating surface 24 and has a stem portion 25 which axially extends from the head portion 23 of the valve member 21. The biasing member 22 is positioned about the stem portion 25 of the valve member 21 for biasing the valve member 21 into a closed position within the float valve 10.

The upper tubular valve body member 16 of the float valve 10 has upper and lower parts 26 and 27 with an axial flow path 28 there through and has an internal annular beveled seat 29 for seating with the seating surface 24 of the valve member 21. The upper tubular valve body member 16 also has external grooved surfaces 18 for receiving external seals 19 for sealing engagement with the float body 11 connected to the oilfield tubular string 12 to form a seal between the float body 11 and the float valve 10 and thus prevents fluid flow from passing either uphold or downhole between the upper tubular valve body member 16 and float body 11 in the drill string 12 in the well bore. The upper tubular valve body member 16 also has threads 38 on the lower part 27 of the upper tubular body 16 for being joined with the lower valve body member 17.

Figure 4:
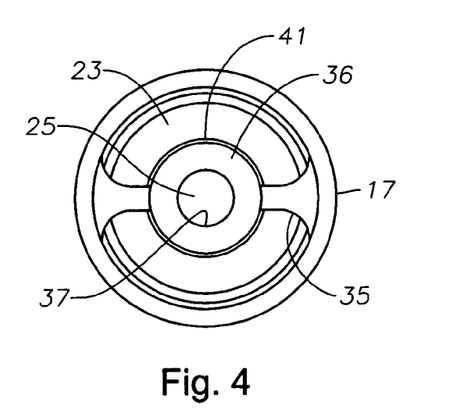
FIG. 4 is a bottom view of the float valve of this invention showing the lower tubular valve body member with its internal web portion and longitudinal support member with axial aperture and a stem of the valve member inserted therein.
Figure 10:
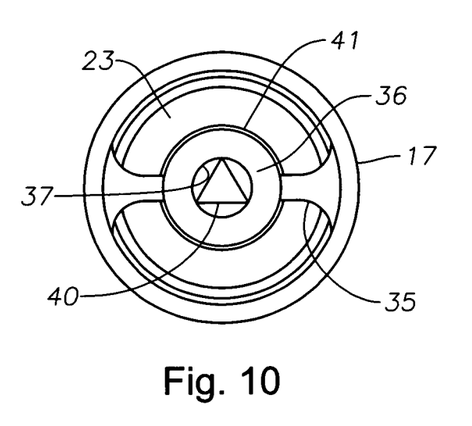
FIG. 10 is a bottom view of one embodiment of the float valve of this invention showing the lower tubular valve body member with its internal web portion and longitudinal support member with axial aperture and stem with three contact surfaces engaging the surfaces created by the axial aperture.

The lower valve body member 17 has an upper and lower part 32 and 33 with an axial flow path 34 there through and has an internal web portion 35, as can be seen in FIGS. 2, 4 and 10, with a central longitudinal support member 36 which has an axial aperture 37 therein for providing surfaces for support and allowing axial movement of stem portion 25 of the valve member 21 when the stem portion 25 is inserted in the axial aperture 37. The lower tubular valve body member 17 also has threads 39 on the upper part 32 of the lower tubular valve body 17 for being joined with the upper valve body member 16 to form the float valve 10.

The internal web portion 35 as seen in FIGS. 2, 4, and 10 is connected to the lower valve body member 17 across the axial flow path 34 to locate the central longitudinal support member 36 in a central axial location such that the axial aperture 37 therein will be positioned to receive the stem portion 25 of the valve member 21 when stem portion 25 is inserted in the axial aperture 37 for central axial positioning of the stem portion 25 of the valve member 21 which positions the valve member 21 in a central axial position in the float valve 10 of this invention.

Figure 6:
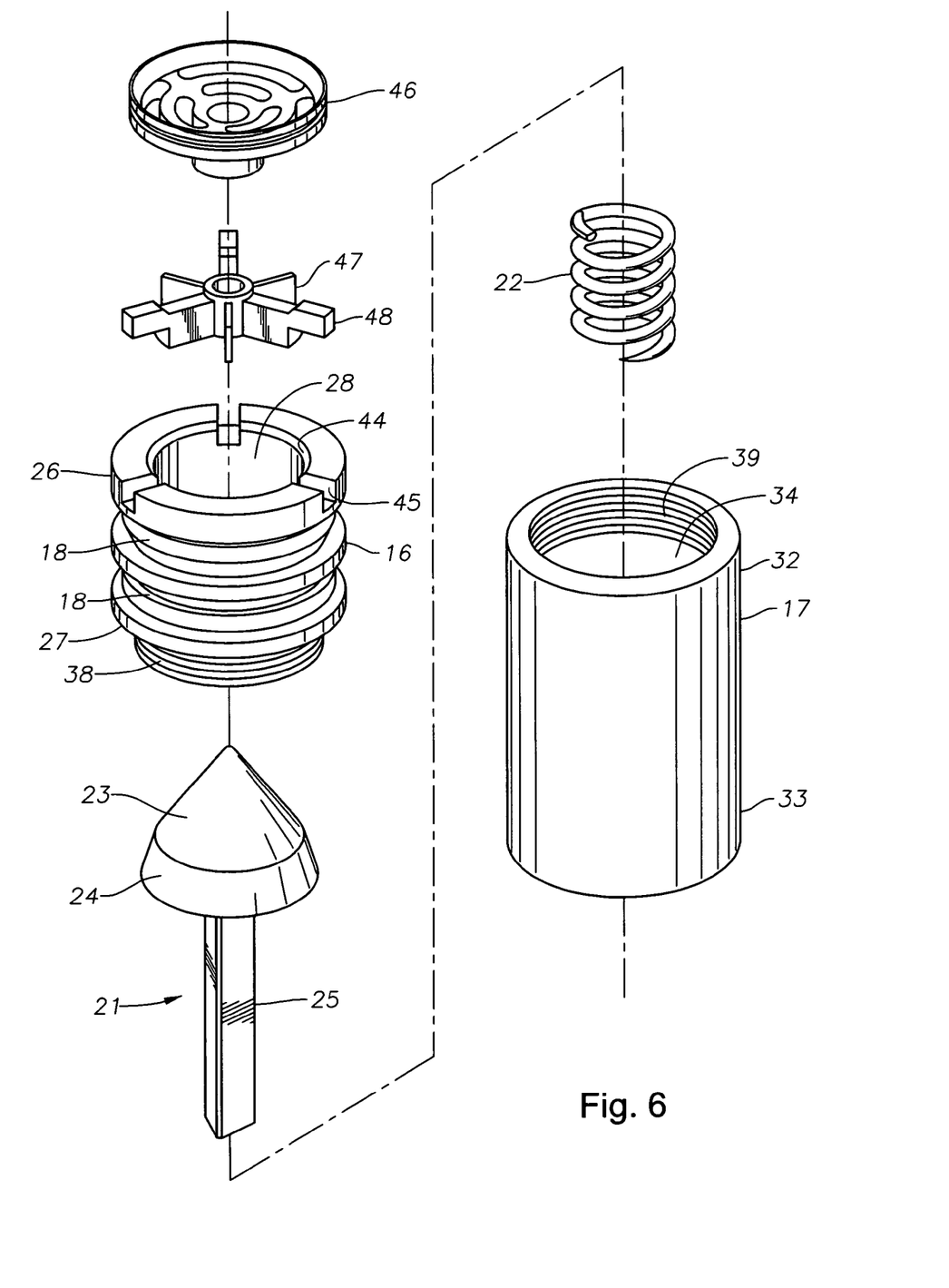
FIG. 6 is an exploded view of one embodiment of the float valve of this invention showing the landing surface for receiving the joint strainer and X-collar filter.

FIG. 6 shows the assembly of the float valve 10 of this invention such that the parts are in precise and exact tolerances with each other and work smoothly together for enhanced float valve life. Referring to FIG. 6 where the valve member 21 with its stem portion 25 is inserted in the axial aperture 37 of the central and longitudinal support member 36 of lower valve body member 17 with the biasing member 22 positioned about the stem portion 25, one can see once assembled then the upper tubular valve body member 16 with its threads 38 are engaged with the lower valve body member 17 with its threads 39 for driving the seating surfaces 24 of the valve member 21 downward for compressing the biasing member 22 to engage the seating surfaces 24 of the head portion 23 of valve member 21 against the internal annular beveled seat 29 of the upper tubular valve body member 16. This process of assembly therefore creates a self seating relationship between seating surfaces 24 of the head portion 23 with the internal annular beveled seat 29 when the float valve 10 of this invention is assembled and allows for tolerances between the stem portion 25 of the valve member 21 and axial aperture 37 in the central longitudinal support member 36 for the elimination of elastomeric seals, valve bearings, and bushings from the float valve 10 of this invention.

Figure 7:
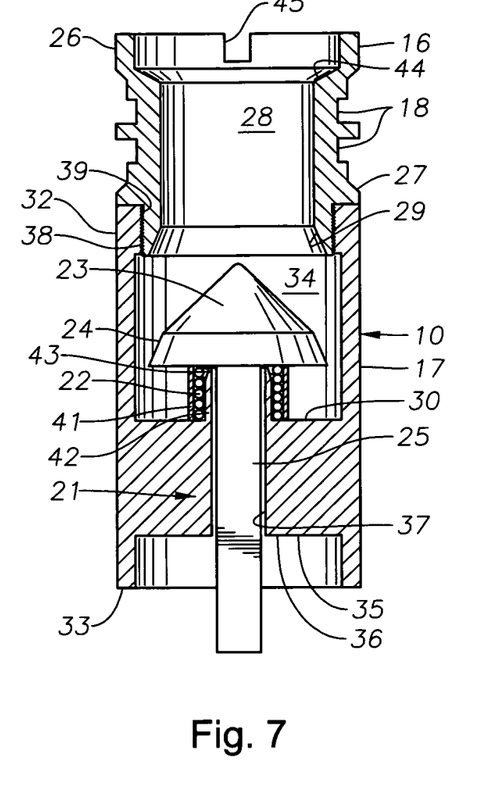
FIG. 7 is a side view, partially in cross-section, of the float valve this invention with the upper tubular valve body member and lower tubular valve body member joined together showing the valve member in an open position and a cover member protecting the biasing member from fluid flow.
Figure 8:
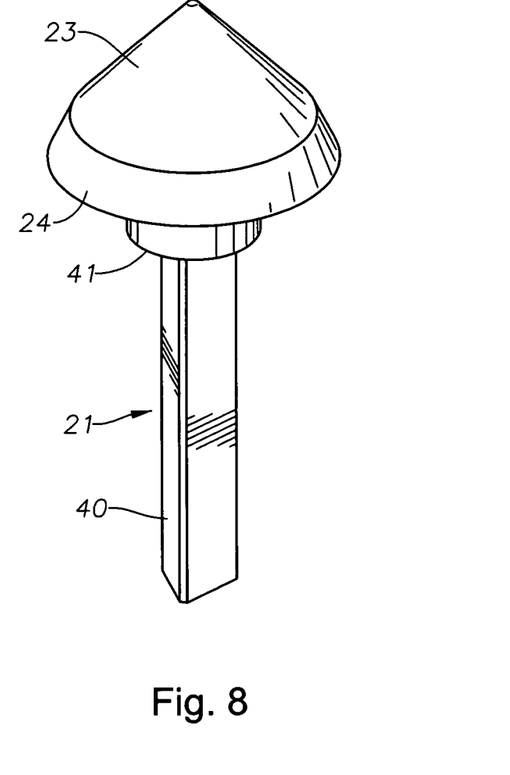
FIG. 8 is a perspective view of one embodiment of the valve member of this invention showing the stem portion of the valve member having a conical head portion and a stem with three contact surfaces for engagement in the axial aperture of the central and longitudinal support members of the lower tubular valve body member and cover member for protecting the biasing member.
Figure 9:
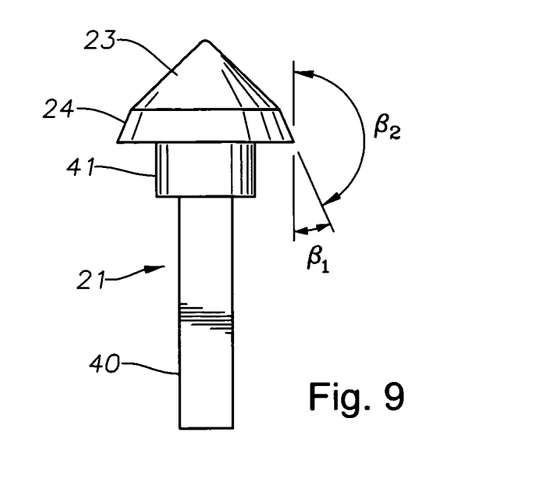
FIG. 9 is a side view of one embodiment of the valve member of this invention showing the valve member with the angular trailing edge portion beveled off at a swept back β-1 angle from the head portion of the valve member for providing a seating surface and showing a stem portion axially extending from the head portion of the valve member and showing the cover member mounted to protect the biasing member and showing a complementary β-2 angle.
Figure 13:
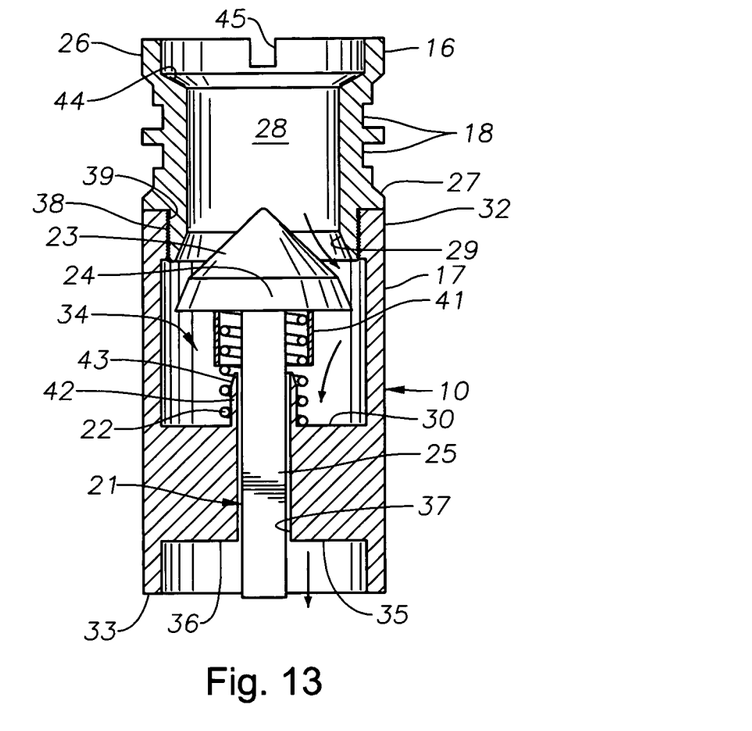
FIG. 13 is a partial cross-section view of one embodiment of the float valve of this invention in an open position and showing flow through the float valve.

To Further understand how the self seating relationship of the sealing surfaces and improved seating surfaces of the float valve 10 of this invention operate, reference may be made to FIGS. 2, 7, and 9, where one skilled in the art must first understand the function of the improved angles between its seating surfaces which provide for smooth fluid flow through the float valve and over the seating surfaces. As can be seen in FIGS. 2, 7, and 9 the surfaces between the seating surface 24 of the head portion 23 of valve member 21 are formed at angles $\beta$-1 from an angle from a line with the axial alignment with the stem portion 25 of valve member 21 and the internal angular beveled seat 29 of upper tubular valve body member 16 are formed at complementary angles $\beta$-2 from an angle from a line with the axial alignment with the stem portion 25 of valve member 21 to form complementary angles with the total of the angles $\beta$-1 and $\beta$-2 equaling 180° and creating substantially matching seating surfaces of substantially the same surface area for forming a seal when these surfaces are engaged. For example, if $\beta$-1 angle was a 20° angle for seating surface 24 of the head portion 23 of valve member 21, then $\beta$-2 angle would be 160° so that the sum angle total would be 180°, as shown in the FIG. 9. Therefore, the seating surfaces have a substantially large surface area because they represent diagonal lines through relatively thick materials and are not subject to being worn down rapidly as other prior art smaller seating surfaces. Also because the angles formed are less than 45°, and in a preferred embodiment angles $\beta$-1, as shown in FIG. 9, range from 10° to 35°, from a line in axial alignment with stem portion 25 of the valve member 21, the seating surface 24 of the head portion 23 of valve member 21 do not project very much into the axial flow path 34 and provide improved fluid flow and long-lasting seating surfaces. Also because those seating surfaces 24, as shown in FIGS. 7, 9, and 13, are at the angular trailing edge portion of the head portion 23 and are at a swept back angle out of the line of flow seating surface 24 of the head portion 23 of the valve member 21 presents a more fluid dynamic profile to the direction of flow through the float valve 10 which reduces turbulence in the float valve 10 of this invention. Because of this reduction in turbulence the float valve 10 of this invention can be used with improved drilling techniques and fluids with new gels and mud containing glass or other kinds of beads and even used with high pressure air drilling operations without any affect on the moving parts from vibration or abrasion both in lateral and vertical wells.

Also the valve member 21 of this invention is composed of a unitized piece of material as can be seen in FIG. 9 which includes both stem portion 25 and head portion 23 which may be conical head as shown or flat head as not shown, as opposed to being composed of two pieces joined together, therefore the valve member 21 is less likely to have a failure between the head portion 23 and the stem portion 25 in response to transmission of cocking forces through the valve member 21. Also by the valve member 21 having angular trailing edge portion beveled off at the trailing edge portion it creates a swept back angle from the head portion 23 for providing a seating surface 24 which makes valve member 21 a self centering seating valve member 21 with internal angular beveled seat 29 and it provides for better alignment of the valve member 21 and minimizes force moments between the stem portion 25 and the head portion 23 of valve member 21 and as a unitized piece is better at distributing cocking or sticking or force moments which may occur.

Figure 11:
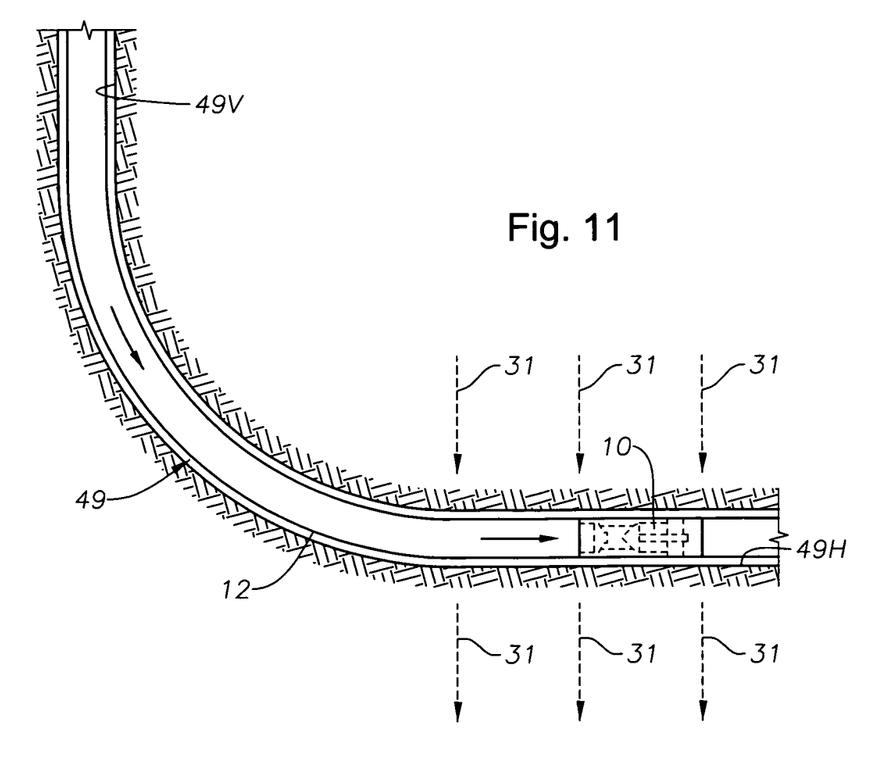
FIG. 11 is a cross-sectional side view of one embodiment of the float valve of this invention in a well bore showing the progression of the float valve from a vertical position to a lateral position in the well bore with the gravitational force lines shown.
Figure 12:
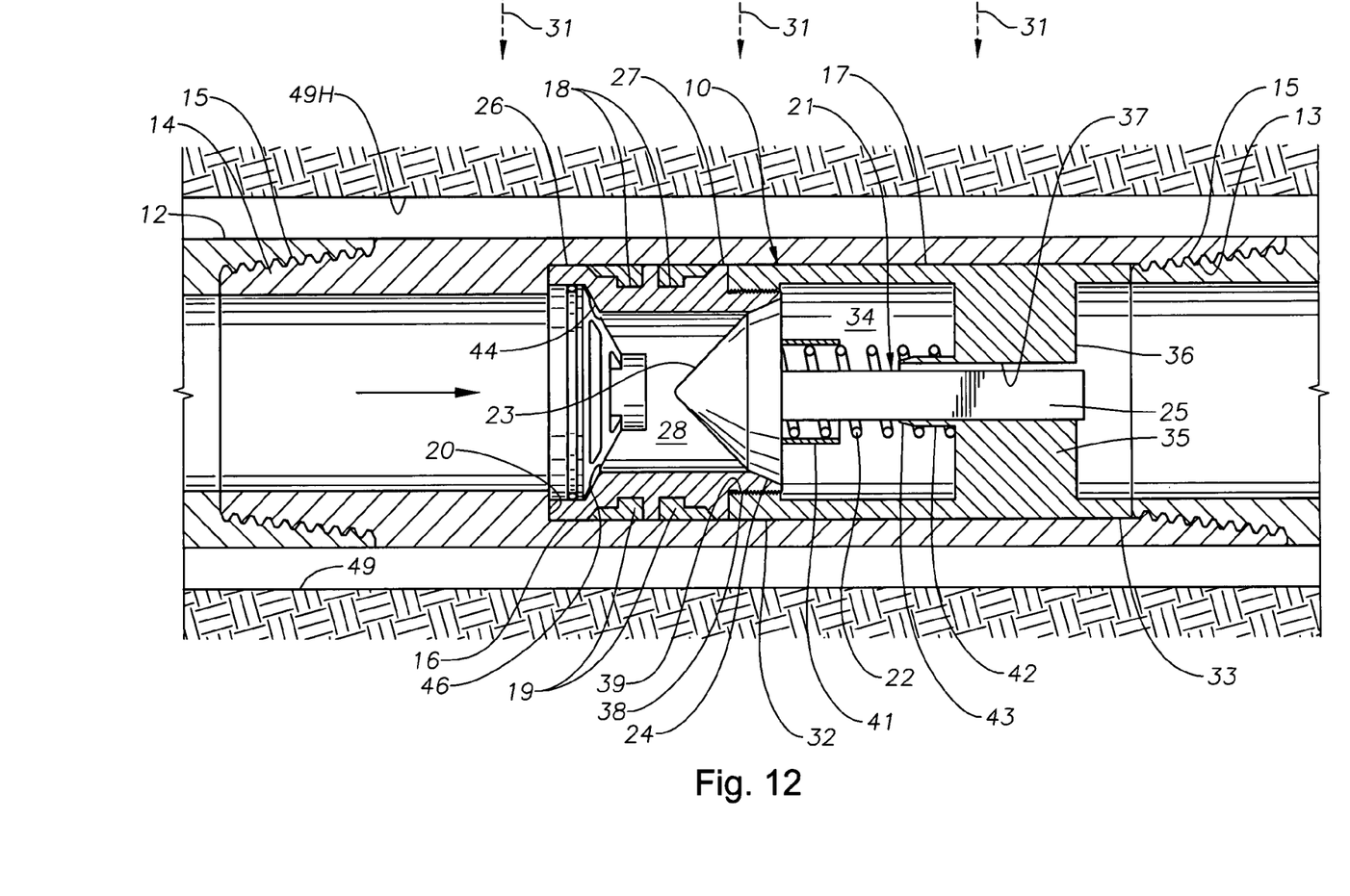
FIG. 12 is a cross-sectional side view of one embodiment of the float valve of this invention in well bore in a lateral position in the well with the gravitational force lines shown.

These cocking or sticking moments are especially pronounced in lateral wells as the valve member 21, as shown in FIGS. 11 and 12, is perpendicular to the force of gravity 31 which provides an opportunity for the head portion 23 of the valve member 21 to catch or drag and create a cocking or sticking moment within the float valve 10. The value of valve member 21 has a self centering seating effect by having angular trailing edge portion beveled off at the trailing edge portion to create a swept back angle for the head portion 23 can be seen in FIGS. 11 and 12 which allows it to be pushed into aligned seating even when the gravitational forces are in axial alignment with the valve member 21 in FIG. 11 when the float valve 10 is in the vertical part of the well and/or when the gravitational forces 31 are perpendicular to the axial alignment of the valve member 21 when the float valve 10 is in the horizontal part of the well. As FIG. 11 shows, a well bore 49 which begins as vertical well bore 49V and transitions to a horizontal well bore 49H with the float valve 10 located there in dramatizes the full range of gravitational forces 31 float valve 10 experience in moving from vertical in a well to horizontal in a well. Referring now to FIG. 12 the float valve from FIG. 11 is shown with the gravitational forces 31 acting perpendicular to the axial alignment the valve member 21 and it can easily be seen how the seating surface 24 of the head portion 25 of valve member 21 would be inclined to move smoothly along the interior surfaces of the lower tubular valve body member 17 as the valve member 21 is moved from seating engagement with internal angular beveled seat 29 of upper tubular valve body member 16 to valve member 21 being moved to a fully open position. Also by seating surface 24 of the head portion 23 of valve member 21 having angular trailing edge portion beveled off at a swept back angle from the head portion 23 one skilled in the art can see the seating surface 24 would be inclined to move smoothly along the interior surface of lower valve body member 17 until it reaches the internal angular beveled seat 29 of the upper tubular valve body member 16 and then into self centering seating with internal angular beveled seat 29 without cocking or sticking moments.

Figure 14:
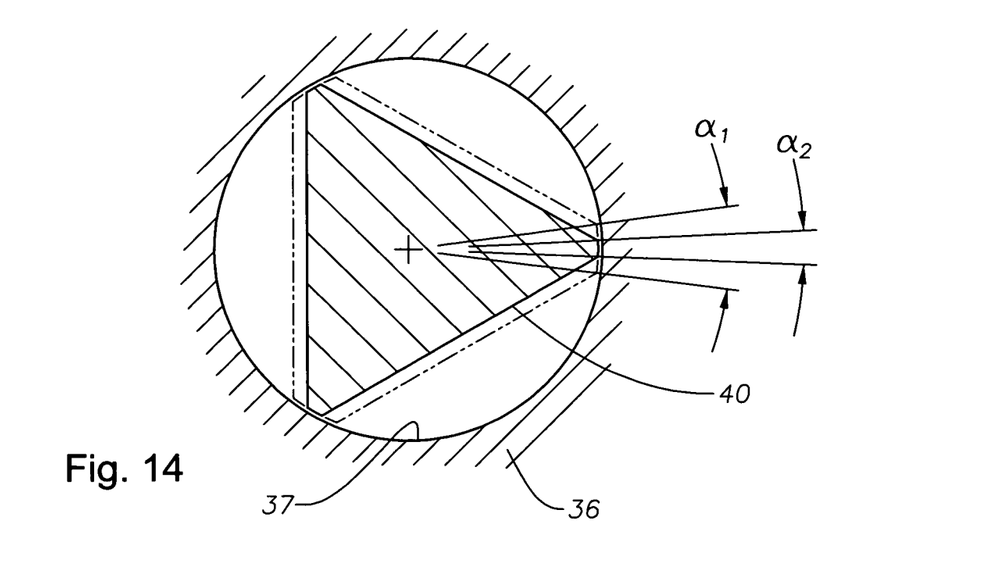
FIG. 14 is a representational cross-sectional view of one embodiment of the bottom view of the lower tubular valve body member of the stem portion of the valve member from FIG. 13 showing at least three contact members for engaging the surfaces created by the axial aperture of the central and longitudinal sport members in the lower tubular body member and showing the range of surface contact of the stem portion by the bisected arc of angles α1 to α2 from the center of the stem portion to the surface of the stem portion.

Also, as part of the improvement to the float valve 10 of this invention, in at least some embodiments, as shown in FIGS. 8, 9, 10, and 14, the stem portion 25 of valve member 21 in addition to being made of a unitized piece, it may also be provided as having at least three contact surfaces in the form of a triangular shaped stem 40 for insertion into the axial aperture 37 of the central longitudinal support member 36 in lower tubular valve body member 17. By referring to FIG. 10, those skilled in the art will appreciate that a triangular shaped stem 40 removes much of the cross-sectional area of a rod like stem portion 25, as in FIG. 1, relative to fluid flow and allows more fluid flow through the axial flow path 34 and it also reduces the amount of surface contact between the triangular shaped stem 40 and the axial aperture 37 which allows elimination of sleeve bearings and bushings used about the stem which ultimately extend the life of the float valve by eliminating these relatively short-lived parts from the float valve 10. With reduced surface area contact between the axial aperture 37 and triangular shaped stem 40 there is also less chance for cocking moments to provide misalignment or sticking between the surfaces. Also, the reduced amount of surface area which allows more fluid flow through the axial flow path 34 provides for a smoother flow and more flow and eliminates turbulence in the flow path 34. As can be seen in FIG. 14 the amount of surface area contact between the triangular shaped stem 40 and the axial aperture 37 can be computed or defined by a bisected arc of angles α1 to α2 which range from 5° to 35° from the center of the triangular stem portion 40 to the surface of the triangular stem portion 40 for determination of how much material is in contact between a triangular stem portion 40 and axial aperture 37. As those skilled in the art will appreciate the contact surfaces of the triangular stem portion 40 of float valve 21 may have more contact surfaces than three and possibly up to eight contact surfaces, not shown, without departing from the scope of this invention.

Also in some embodiments of this invention, as shown in FIGS. 2, 7, 8, and 9, a cover member 41 is attached to the head portion 23 of valve member 21 and is positioned concentrically about stem portion 25 and extends axially from the head portion 23 sufficiently to allow biasing member 22 to be received between the cover member 41 and the stem portion 25 for protecting the biasing member 22 as the valve 21 is moved axially in the float valve 10 in response to fluid flow as shown in FIG. 7.

Figure 5:
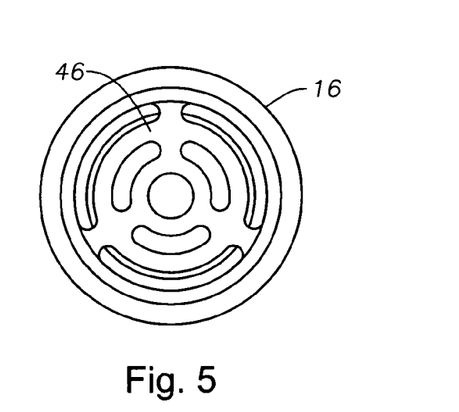
FIG. 5 is a top view of the float valve this invention with X-filter landed in place.

The central longitudinal support member 36 in the lower tubular valve body member 17 which has the axial aperture 37 there in for providing support and allowing axial slidable movement for the stem portion 25 or triangle stem portion 40 also provides a guide stabilizer portion 42 for acting as a stop 30 for the biasing member 22 and for receiving the biasing member 22 there about as the stem portion 25 or triangle stem portion 40 of the valve member 21 is moved axially in the lower tubular valve body member 17 in response to fluid flow. Also provided is a guiding angular leading edge 43 on the guide stabilizer portion 42 for guiding the biasing member 22 about the guide stabilizer portion 42 for providing alignment of the biasing member 22 as the valve member 21 is moved axially in response to flow as shown in FIGS. 7 and 13. The guide stabilizer portion 42 with the guiding angular leading edge 43 as shown in FIGS. 1 and 5 is also guiding the biasing member 22 into position over the guide stabilizer portion 42 for preventing wear to the biasing member 22 as it is repeatedly axially moved in and out over the guide stabilizer portion 42 in response to fluid flow through the float valve 10. It will be appreciated by those skilled in the art from the above description that for the cover member 41 and guide stabilizer portion 42 to work in cooperation to cover and receive the biasing member 22 against fluid flow through the float valve 10 that the cover member 41 and the guide stabilizer portion 42 must have lengths sufficient to cover and receive the biasing member 22 when the triangle stem portion 40 is moved axially to a fully open position in the lower tubular valve body member 17 in response to fluid flow when the triangle stem portion 40 of valve member 21 moved axially to fully open position in response to fluid flow for allowing full coverage of the biasing member 22 by the cover member 41 and full support by the guide stabilizer portion 42 without interference of either the cover member 41 or the guide stabilizer portion 42 by the other.

Also by referring to FIGS. 1, 2, 7 and 13, the guide stabilizer portion 42 can be seen to be a tubular extension of the central longitudinal support member 36 which extends the support structure into which the axial aperture 37 is formed for providing support for allowing axial slidable movement of the stem portion 25 or triangle stem portion 40 of the valve member 21 through the axial aperture 37 formed by both the guide stabilizer portion 42 and central longitudinal support member 36. The axial aperture 37 formed by both the guide stabilizer portion 42 and the central longitudinal support member 36 for support of the stem portion 25 or triangle stem portion 40 of the valve number 21 to allow axial slidable movement has been found to be most effective for slidable engagement without being cocked or jamming the stem portion 25 or triangle stem portion 40 of valve member 21 in its movement when the support surface of the axial aperture 37 formed in the central longitudinal support member 36 and the guide stabilizer portion 42 have a combined support surface which supports 30 to 60% of the stem portion 25 or triangle stem portion 40 of the valve member 21. It will be appreciated by those skilled in the art, that if a float valve 10 is being used only in a vertical well bore that the percentage of support can be moved toward the lower range of 30% support and if the float valve 10 is being used in a well with both lateral and vertical well bore configuration, that percentage of support would be moved toward the higher range 60% of support for the stem portion 25 or triangle stem portion 40 of the valve member 21.

While X-collar filters for filtering fluid flow and various leg spiders for filtering flow and performing other functions in the well bore may be known to those skilled in the art, they would not be aware of or find obvious float valves which were designed or provided with angular seating members for receiving X-collar filters and notched seating members for receiving the legs of various spiders, because the prior art float valves were deprived of the capability of working with X-collar filters and spiders. Referring to FIGS. 1, 2, 5, 6, 7, and 13 it can be seen that the float valve of this invention provides and includes the novel concept of providing angular seat member 44 and notched seating members 45 for respectively receiving X-collar filters 46 and spiders 47 with legs 48 configuration for being landed on float valve 10 of this invention. This novel combination of providing angular seat members 44 and notched seating surfaces 45 on the upper tubular valve body member 16 at its upper part 26 provides a valuable and novel combination which can be used to prevent damage to the float valve 10 and other drilling equipment below the float valve 10 by combining anger seat member 44 and notched seating surfaces 45 on the float valve 10 with the landed X-collar filters 46 and spiders 47 for filtering fluids before entry into the float valve 10.

It will be understood by those skilled in the art that there will be various modifications to the float valve 10 of this invention apart from the above description of the preferred embodiments. While preferred embodiments of this invention have been described in detail, it should be understood that this explanation is for illustration only and that the invention is not limited to the disclosed embodiments. It should be understood that alternative float valves for use in vertical and lateral wells and alternative valve elements for use in the float valves will be apparent to those skilled in the art in view of this disclosure, it does not minimize scope of this invention. Modifications to the described structure and operation of this float valve are thus contemplated and may be made without departing from the spirit of the invention which is defined by the claims.

In the drawings and specification, there have been disclosed typical preferred embodiments of the invention and, although specific terms are employed, they are used in a generic and descriptive sense only and not for the purpose of limitation, the scope of the invention being set forth in the following claims.

The invention claimed is:

1. A float valve assembly for sealing engagement within an oilfield tubular positioned down hole within the well bore for preventing counter flow of fluid-borne debris from within the well comprising:

a. a valve member having a conical head portion and a trailing edge portion with beveled off surface from said conical head portion to said trailing edge portion of valve member at a swept back angle from said conical head portion for providing a seating surface substantially all along said beveled off surface to said trailing edge portion and having a stem portion with at least 3 projecting contact stem surfaces defined by the bisected arc of said contact stem surfaces of an angle from 5 degrees to 35 degrees from the center of said stem portion to said contact stem surfaces of said stem portion arranged in a circle equal distance from each other axially extending from said conical head portion of said valve member, b. A biasing member positioned about said stem portion of said valve member for biasing said valve member toward seating engagement of said seating surface of said valve member, c. An upper tubular valve body member having an upper and lower part with axial flow there through and having an internal annular beveled seat for substantially matching said seat with said seating surface of said valve member, and external seals for sealing engagement with said oilfield tubular and threads on said lower part of said upper tubular valve body member, and d. A lower tubular valve body member having an upper and lower part with axial flow there through and having an internal web portion with a central and longitudinal support member which has an axial and circular aperture therein for providing surfaces for support of said at least 3 projecting contact stem surfaces of said stem and allowing axial and circular movement for said stem of said valve member when said stem is inserted in said circular axial aperture and threads on said upper part of said lower tubular valve body member for engagement with said threads of said upper tubular valve body member for joining said upper and lower tubular valve body members and for compressing said biasing member to substantially engage all said seating surface of said beveled off surface of trailing edge portion of said conical head portion of said valve member with said internal annular beveled seat of said upper tubular valve body member for allowing engagement and disengagement of said seating surfaces in response to fluid flow pressure in said float valve.

2. A float valve assembly of claim 1 wherein said seating surface of said trailing edge portion of said valve member beveled off surface at said trailing edge portion at said swept back angle and said seat of said internal annular beveled seat of said upper tubular valve body member further comprise;

a. Seating surfaces formed at complimentary angles from a line in axial alignment with said valve member for said seating surface of said trailing edge portion of said valve member and for said seating of said internal annular beveled seat of said upper tubular valve body member to form substantially matching seating surfaces of substantially the same surface area for forming a seal there between when engaged.

3. A float valve assembly of claim 2 wherein said trailing edge portion of said valve member beveled off surface at said trailing edge portion at said swept back angle further comprises;

a. an angle less than 45° from a line in axial alignment with said valve member for providing sufficient surface area between said trailing edge portion of said valve member and said internal annular beveled seat of said upper tubular valve body member to form direct sealing surfaces there between when engaged and for providing smooth flow in said float valve when unengaged.

4. A float valve assembly of claim 3 wherein said angle less than 45° from a line in axial alignment with said valve member further comprises;
   a. An angle from 10° to 35° from a line in axial alignment with said valve member for providing sufficient surface area between said trailing edge portion of said valve member and said internal annular beveled seat of said upper tubular valve body member to form direct sealing surfaces there between when engaged and for providing smooth flow in said float valve when unengaged.

5. A float valve assembly of claim 4 wherein said valve member having a conical head portion and stem portion axially extending from said conical head portion further comprises;
   a. a cover member mounted to said conical head portion concentrically about a portion of said stem portion and extending axially from said conical head member of said valve member for allowing said biasing member to be received between said cover member and said stem portion for protecting said biasing member as said valve member is moved axially or circularly in response to fluid flow.

6. A float valve assembly of claim 5 wherein said web portion of said lower valve body member with said central and longitudinal support member which has an axial and circular aperture therein for providing support and allowing axial and circular slideable movement for said stem of said valve member when inserted in said circular axial aperture of said lower valve body member further comprises:
   a. A guide stabilizer portion for said biasing member which extends toward said conical head portion of said valve member for receiving said biasing member there about when said valve member and said stem of said valve member are moved axially or circularly in said lower valve body member, in response to fluid flow.

7. A float valve assembly of claim 6 wherein said guide stabilizer portion for said biasing member further comprises;
   a. A guiding angular leading edge on said guide stabilizer portion for guiding said biasing member about said guide stabilizer portion for aligning said biasing member when said valve member is moved axially or circularly in response to fluid flow.

8. A float valve assembly of claim 7 wherein said stem portion of said valve member axially extending from said conical head portion of said valve member for axial or circular movement further comprises:
   a. a stem portion formed as a unitized piece with said conical head portion of said valve member, and has 3 to 8 contact surface points arranged in a circle equal distance from each other for engagement with said surfaces forming said circular axial aperture of said central and longitudinal support member at said contact surfaces for allowing axial or circular movement and for support of said stem portion and said conical head portion of said valve member.

9. A float valve assembly of claim 8 wherein said cover member and said guide stabilizer portion further comprises;
   a. said cover member and said guide stabilizer portion having lengths in cooperative relationship for said cover member to fully cover said biasing member when said valve member and said stem of said valve member are moved axially to a fully open position in said lower valve body member, in response to fluid flow and for said stabilizer portion to fully receive said biasing member there about when said valve member and said stem of said valve member are moved axially to a fully open position in said lower valve body member, in response to fluid flow for allowing full coverage of said biasing member by said cover member and full support by said guide stabilizer portion without interference of either by the other.

10. A float valve assembly of claim 9 wherein said web portion of said lower valve body member with a central and longitudinal support member which has an axial and circular aperture therein for providing support and allowing axial and circular movement for said stem of said valve member when inserted in said circular axial aperture of said lower valve body member further comprises said support surface which supports from 30-60% of said stem portion axially extending from said conical head portion of said valve member.

11. A float valve assembly of claim 10 wherein said upper tubular valve body member having an upper part with axial flow there through further comprises;
   a. an angular seat member formed in said upper part of said upper tubular valve body for receiving a X-collar filter for filtering fluid flow into said float valve assembly at said upper tubular valve body member before entry into said float valve body.

12. A float valve assembly of claim 10 wherein said upper tubular valve body member having an upper part with axial flow there through further comprises;
   a. at least three notched receiving members formed and positioned in said upper part of said upper tubular valve body for receiving the legs of a spider for filtering fluid flow into said float valve assembly and said upper tubular valve body member before entry into said float valve body.

* * * * *